United States Patent [19]

Sink

[11] 3,752,286
[45] Aug. 14, 1973

[54] SELF-ADJUSTING CLUTCH
[75] Inventor: William Howard Sink, Auburn, Ind.
[73] Assignee: Dana Corporation, Toledo, Ohio
[22] Filed: Feb. 24, 1972
[21] Appl. No.: 229,050

[52] U.S. Cl....... 192/111 A, 188/196 F, 192/12 BA, 64/9 R
[51] Int. Cl............................................. F16d 13/75
[58] Field of Search..................... 192/111 A, 70.25, 192/70.26, 12 BA; 188/71.8, 71.9, 196 F, 196 BA

[56] References Cited
UNITED STATES PATENTS

| | | | |
|---|---|---|---|
| 3,115,217 | 12/1963 | Butler | 192/12 BA |
| 2,241,223 | 5/1941 | Spase et al. | 192/111 A |
| 2,575,012 | 11/1951 | Harvey | 192/12 BA |
| 3,425,526 | 2/1969 | Baer | 192/12 BA |
| 2,280,355 | 4/1942 | Spase et al. | 192/111 A |

Primary Examiner—Benjamin W. Wyche
Attorney—Walter E. Pavlick, John F. Teigland et al.

[57] ABSTRACT

An automatic adjusting device for a spring loaded friction type clutch is incorporated, as a sub-assembly, in the lever system of the clutch between an actuating collar and an axially movable adjuster ring so as to be operable to advance the adjusting ring by very small increments as the friction surfaces of the clutch wear. The improvement being an adjusting device having support means secured to the clutch cover and coil springs concentrically disposed about a pair of hub members adapted to be coupled through a lost motion connection and rotatably carried on the support means. The coil spring associated with the first hub member is connected to the actuating collar and operable thereby to rotatably drive the hub members through the coupling connection. The coil spring associated with the second hub member engages the support means and reacts thereon to function as a backstop or drag brake when the first coil spring is not rotatably driving the first hub member. A worm gear integral with the second hub member engages and effects axial movement of the adjusting ring when the hub members are rotated past their lost motion connection by the first spring.

5 Claims, 10 Drawing Figures

Patented Aug. 14, 1973  3,752,286

Patented Aug. 14, 1973 3,752,286

SELF-ADJUSTING CLUTCH

BACKGROUND OF THE INVENTION

1. Field of the Invention

The present invention relates to spring loaded friction clutches in general and more particularly to devices for automatically compensating for wear in the friction surfaces of such clutches.

2. Description of the Prior Art

Automatic adjusting devices interposed in the lever system of a friction clutch so as to be operable to compensate wear of the friction surfaces are well known. Such devices are disclosed in U.S. Pat. Nos. 2,207,051 and 2,280,355. While these particular arrangements operate in a satisfactory manner to compensate for wear, it can be seen that numerous parts are required to accomplish the desired result. Further, the operating parts are disposed outside the cover thereby subjecting them to possible damage. While earlier patents, such as shown in U.S. Pat. No. 2,057,802, have remedied this problem somewhat by providing an automatic adjusting device positioned within the cover member, here again, the arrangement required an excessive number of operating parts in addition to resulting in a structure which is exceptionally difficult to service.

These problems have been solved by an automatic clutch adjusting device constructed in accordance with the present invention.

SUMMARY OF THE INVENTION

Stated briefly, the present invention comprises interposing an adjusting device in the lever system of a friction disk clutch assembly in such a manner as to operatively connect a threaded adjusting ring and an axially shiftable actuating collar so that wear occurring in the friction surfaces of the clutch is automatically taken-up during operation of the clutch. The adjusting device includes a mounting bracket secured to the clutch cover with a support pin carried thereby for rotatably carrying a pair of hub members which are drivingly connected through a lost motion coupling connection. For rotating the hub members a coil spring is concentrically disposed about one hub member and has a lever extension formed on one end of the spring engageable with a notch in the axially shiftable actuating collar so as to be operable thereby to cause rotation of the hub member while the opposite end of the spring is free. A similar coil spring is concentrically disposed about the other hub member with one end secured to the mounting bracket while the opposite end is free. Also integral with this same hub member is a worm gear for selectively engaging suitable teeth provided of the adjusting ring. With wear, a release stroke greater than a predetermined amount will cause the coil spring to drive the first mentioned hub member whereby it rotates the second hub member slightly after passing through the predetermined lost motion travel causing coresponding rotation of the integral worm gear and thereby rotation of the adjusting ring. The lost motion connection between the hub members is sufficient to permit limited relative movement to occur between the hub members during a normal release stroke so that an adjustment does not occur until sufficient wear has taken place, in addition to also allowing the release parts to travel sufficiently to unload the adjusting ring before the adjusting device attempts to move the adjusting ring.

OBJECTS OF THE INVENTION

Accordingly, the present invention provides a simple combination of parts within the clutch cover for automatically accomplishing the necessary wear adjustment occurring in the friction surfaces of a friction type clutch.

Another object of the invention is to provide an improved automatic adjusting device in the form of a sub-assembly which provides for easy initial adjustment of the clutch and also for quick access for repair purposes.

Further objects and advantages of this invention will become apparent from the following description of the preferred embodiment when taken together with the accompanying drawings.

DESCRIPTION OF THE PREFERRED EMBODIMENT

Figures 1, 2:
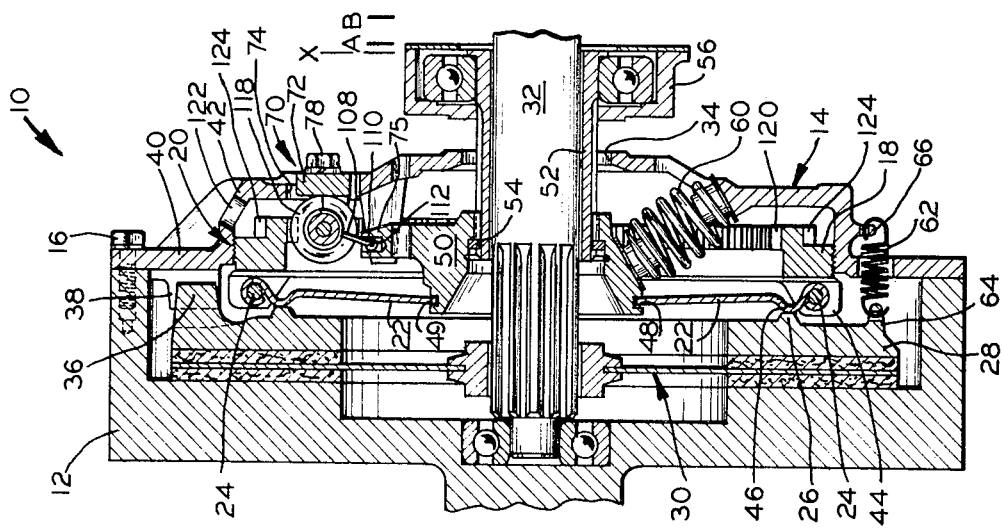
FIG. 1 is an end elevational view of a clutch embodying this invention.
FIG. 2 is a sectional view taken along the line 2—2 of FIG. 1.

Referring now to FIGS. 1 and 2 of the drawings, there is shown generally at 10, a spring loaded friction clutch of the pull-type which is drivingly connected for unitary rotation to a drive member in the form of a flywheel 12. More particularly, the clutch 10 comprises a cover 14 secured to the flywheel 12 at its outer periphery, by means of a plurality of bolts 16 so as to be driven thereby, an adjusting ring 18 peripherally connected to the interior of the cover 14 by a threaded engagement, shown generally at 20, so that circumferential rotative movement of the adjusting ring relative to the cover results in simultaneous axial movement of the adjusting ring 18 relative to the cover 14 and other portions of the clutch 10. A plurality of radially extending clutch operating levers 22 are pivotally connected by pins 24 to the back face of the adjusting ring 18 and engage an annular shoulder 26 formed on a pressure plate 28 for urging the pressure plate forwardly to press a driven member 30 into frictional driving engagement with the flywheel 12. Thus, the pins 24 serve as pivot points for the levers 22 and are supported on the adjusting ring 18.

An output shaft, shown fragmentarily at 32, is adapted to be clutched into driving relationship with the flywheel 12 through the driven member 30, and is piloted at its forward end in the flywheel and extends axially rearwardly therefrom through an opening 34 in the center portion of the cover 14. The driven member 30 is splined for unitary rotation and relative axial movement on the forward end of the output shaft 32 so that it can be pressed into driving relationship with the flywheel 12 by means of the axially movable pressure plate 28. The pressure plate 28 is also drivingly connected to the cover 14 by means of a plurality of drive lugs 36 extending axially from the rear face thereof into registering slots 38 formed in a radial flange portion 40 on the front face of the cover 14.

The adjusting ring 18 is annular in configuration and adapted to be adjustable axially to take-up for wear of the friction surfaces of the clutch. For this purpose, the adjusting ring 18 is peripherally connected to an axial flange portion 42 on the cover 14 by the threaded engagement 20 so that circumferential movement of the adjusting ring 18 rotates the same relative to the cover 14 resulting in axial movement of the adjusting ring relative to the cover and also to the other portions of the clutch. A plurality of circumferentially spaced pairs of forwardly extending ears 44 are provided on the inside face of the adjusting ring 18 for supporting the opposite ends of the pivot pin 24 upon which the outer ends of the release levers 22 are pivotally mounted. Radially inwardly from this pivotal connection, the levers 22 are provided with a detent portion 46 which projects axially to the left and engages the annular shoulder 26 formed on the rear face of the pressure plate 28. In this manner, leftward movement of the inner ends of the levers 22 pivots the lever about the pivot pin 24 and presses the detent portion 46 against the shoulder 26 urging the pressure plate 28 forwardly, to the left in FIG. 2, to press the driven member 30 into frictional engagement with the flywheel 12.

Means is provided to pull the inner ends of the clutch levers 22 axially to the right, as viewed in FIG. 2, to disengage the clutch. To this end, the radial inner ends 49 of the levers 22 are disposed in a peripheral groove 48 at the inner end of an actuating collar 50 which collar is splined to and secured against axial movement relative to the left end of a hollow release sleeve 52 by an annular snap ring 54. The sleeve 52 is concentrically disposed about the output shaft 32 and spaced a sufficient distance outwardly thereof so as to be freely rotatable and axially movable relative thereto. The sleeve 52 is axially elongated and passes through the central opening 34 in the cover 14 and has secured to the right end thereof a throw-out bearing 56 with the throw-out bearing operatively connected by suitable linkage (not shown) to a foot pedal for inducing axial movement to the sleeve 52 and accordingly the actuating collar 50 for controlling operation of the clutch between its engaged and disengaged position.

Means is shown generally at 58 for normally urging the inner ends of the levers 22 and thereby the pressure plate 28 axially to compress the driven member 30 against the flywheel 12 and is constructed in accordance with the teachings of my corresponding U.S. Pat. No. 3,394,788. This means includes a plurality of pairs of circumferentially spaced coiled compression engaging springs 60 which are disposed angularly so as to be compressed between the cover 14 and the actuating collar 50 and react to urge the collar and hence the inner ends 49 of the clutch levers 22 to the left, in FIG. 2, thereby biasing the pressure plate 28 toward the flywheel 12 to compress the driven member 30 therebetween. Pivoting movement of the clutch levers 22 about pin 24 by the actuating collar 50 results in pulling of the inner ends 49 of the levers 22 to the right allowing the pressure plate 28 to be moved away from the flywheel 12 by a plurality of circumferentially spaced small coiled tension return springs 62. Each spring 62 is attached at one of its ends to an apertured boss 64 on the rear of the pressure plate 28 and at its other end to an apertured radial web portion 66 on the cover 14 and by this arrangement serves to withdraw the pressure plate 28 from the driven member 30 as the biasing force of the engaging springs 60 is overcome.

For the purpose of compensating for wear in the friction surfaces of the clutch, means is provided for automatically shifting the adjusting ring 18 axially inwardly, to the left as viewed in FIG. 2, so that as the wear occurs, the pivot point about which the levers 22 pivot, that is pin 24, moves gradually toward the flywheel 12. More particularly, this means takes the form of an automatic self-adusting device, shown generally by the actuating 50, in numeral 70, adapted to be operable by the actuating collar 50, in response to movement of the throw-out bearing 56, when the clutch is being shifted to its disengaged position and sufficient wear has resulted in the friction surfaces to require an adjustment. The various parts of the adjusting device 70 are designed to be operative only when the throw-out bearing 56 is moving in a direction from position A to position B, left to right as seen in FIG. 2, but will not effect an adjustment unless the starting position of the the throw-out mechanism 56 was previously returned to a point beyond the normal starting position, e.g., position X to the left of position A in FIG. 2.

Normally, the throw-out bearing 56 starts from position A and moves to the right to position B to effect the throwing-out operation of the clutch and then back to the starting position A, which is considered to be the normally engaged position of the clutch. As the friction surfaces of the clutch gradually wear, the throw-out bearing 56, release sleeve 52 and actuating collar 50, which are interconnected for simultaneous movement, move further and further to the left of the starting position A toward position X. When sufficient wear of the friction surfaces has occurred to require an adjustment, the throw-out mechanism 56, release sleeve 52 and actuating collar 50 as a unit, will have moved or returned a sufficient distance beyond or to the left of the starting position to permit operation of the adjusting device 70 to become effective to adjust the clutch to take-up for wear. After each adjustment the normal starting position A of the clutch shifts a slight distance to the left equal to the adjustment so that a normal clutch operation is matained.

The parts, their relationship and functions thus far described are well known in the prior art. The following description will now be directed to the improved means for automatically compensating for the wear occurring in the friction surfaces of such a clutch.

SELF-ADJUSTING DEVICE 70

Figure 3:
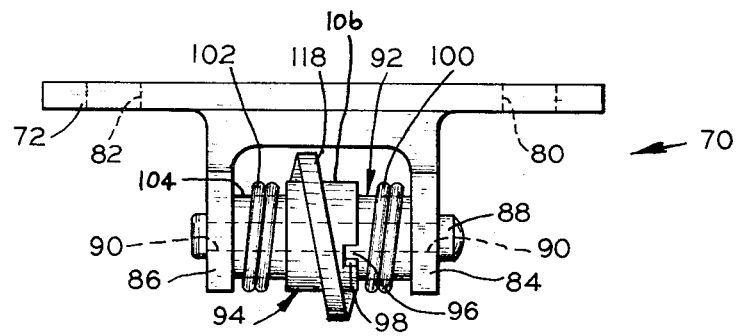
FIG. 3 is an enlarged plan view of the automatic adjusting device of the present invention.
Figure 4:
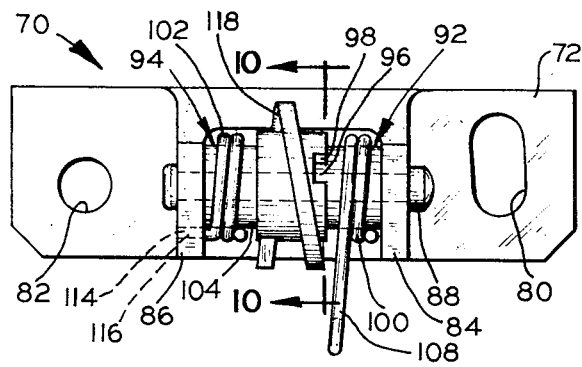
FIG. 4 is a front elevational view of the device illustrated in FIG. 3.
Figure 5:
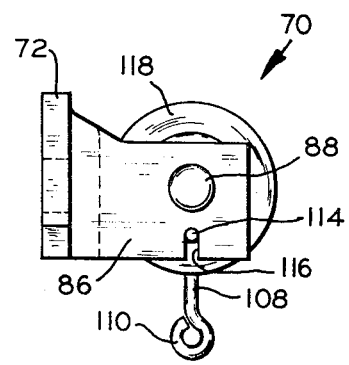
FIG. 5 is a side elevational view from the left of the device shown in FIG. 4.
Figure 6:
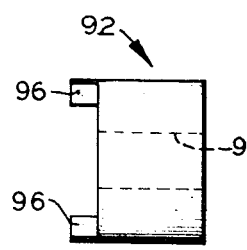
FIGS. 6 and 7 are enlarged side and end views respectively of one of the hub members.
Figure 7:
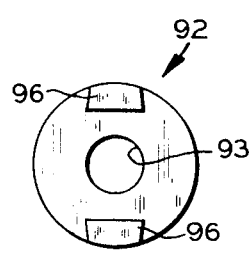
Figure 8:
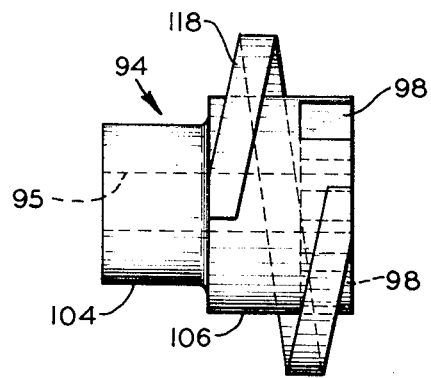
FIGS. 8 and 9 are enlarged side and end views respectively of the other hub member.
Figure 9:
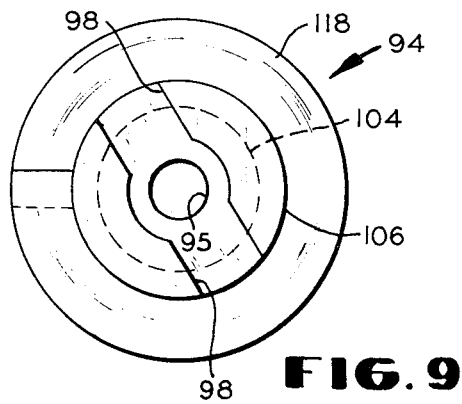
Figure 10:
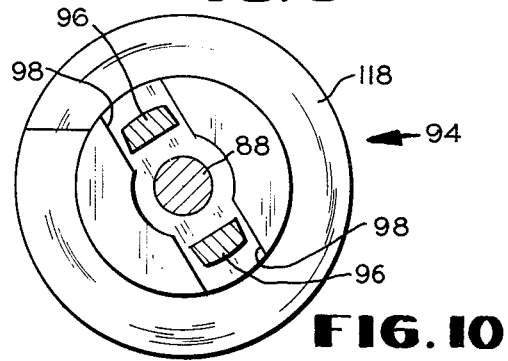
FIG. 10 is a section view taken substantially along line 10—10 of FIG. 4 to more clearly see the coupling connection between the hub members.

Referring now more particularly to FIGS. 3–5, the self-adjusting device 70 is shown as a sub-assembly adapted to be incorporating in the lever system of the clutch 10 between the adjusting ring 18 and the actuating collar 50. To this end, the self-adjusting device 70 includes an elongated mounting bracket 72, and as seen in FIG. 1, the bracket extends across an opening 74 in the back wall portion of the cover 14, the opening is of somewhat triangular shape for a purpose to be explained hereinafter. Also, the opening 74 is situated in such a manner as to expose an area between the central opening portion of the adjusting ring 18 and the external portion of a radially outwardly extending lug 75 integral with the actuating collar 50, both portions being radially spaced from each other but positioned in such a manner as to lie in substantially the same vertical plane. The latter relationship is designed for the purpose of accommodating the various operating parts making up the self-adjusting device 70. As seen best in FIG. 1, the mounting bracket 72 is secured at opposite ends to the back face of the cover 14 by bolts 76-78, passing through openings 80-82 respectively, which threadedly engage suitable openings provided in the back face of the cover 14. A pair of spaced ears 84-86 extend inwardly toward the flywheel 12 and into the space provided between the adjusting ring 18 and the lug 75 of the actuating collar 50. A pin 88 is secured in axially aligned openings 90—90 in the spaced ears 84-86 for rotatably supporting thereon, between the ears, a pair of first and second cylindrical hub members 92 and 94 respectively. The hub members are rotatably supported on the pin 88 by means of a centrally located opening 93 on the hub member 92 and a centrally located opening 95 on the hub member 94 and are operatively interconnected through a lost motion coupling connection. The coupling connection is in the form of a pair of axially inwardly directed diametrically disposed drive lugs 96—96 on the inner face of the hub member 92 which fit into slots 98—98 formed on the mating inner face of the hub member 94. As shown more clearly in FIG. 10, the slots 98—98 are wider than the lugs 96—96 so as to provide a predetermined free movement between the hub members to thereby provide a lost motion connection. The side walls of the slots are parallel and straight sided while the side walls of the drive lugs are tapered outwardly so that as relative rotation takes place they engage along their entire faces.

Resilient means is provided for each of the hub members in order to accomplish the desired operation. More particularly, the resilient means consists of a coil spring 100 concentrically disposed about the cylindrical outer surface of the first hub member 92 and similar coil spring 102 concentrically disposed about the cylindrical outer surface of a reduced diameter portion 104 provided on the outer end of the second hub member 94. As seen best in FIG. 3, with the hub members in their assembled relationship, the reduced diameter portion 104 on the hub member 94 provides an outer cylindrical surface equal to that of the outer cylindrical surface of the hub member 92 with the larger cylindrical portion 106 on the inner end of the hub member 94 being centrally located between the spaced ears 84 and 86 on the mounting bracket 72.

The coil springs 100-102 are constructed so as to be substantially equal and have a internal diameter slightly smaller than the outside diameter of the cylindrical surface on their associated hub members so as to normally rest on or embrace the surface under a light tension and thus normally having a slight frictional drag on the hubs. Each spring is coiled into a plurality of right-hand helical convolutions so that in one direction of rotation they can be wound while in the reverse direction of rotation they unwind.

The coil spring 100 is designated to provide a driving connection between the first hub member 92 and the actuating collar 50 so that as the actuating collar is operated to move in one direction, from left to right in FIG. 2 to position B, the spring coils will be energized so that they will contract against the external surface on the hub member 92 to wind and thereby grip and transmit drive thereto, while movement of the actuating collar 50 to the left, back to its starting position A, results in the spring coils being in a position to unwind and override the hub member with only a slight drag on the external surface thereof not sufficient to cause it to rotate in a reverse direction. For accomplishing this driving connection, the spring 100 has a radially downwardly extending lever 108 provided at its inner end while the opposite end of the spring is free. A loop 100 is formed at the lower end of the lever 108 for reception in a suitable opening 112 provided in the outer surface of the lug 75 on the actuating collar 50. With reference to FIG. 1, it can be seen that the bracket 70 is mounted on the cover 14 so as to be located slightly to the right of the vertical axis of the clutch to enable the lever 108 and opening 112 to lie along the same vertical plane. With this engagement, axial shifting of the actuating collar 50 in a righward direction, as viewed in FIG. 2, will operate the lever 108 so that it tends to wind the coils of the spring 100 tightly on the external surface of the hub member 92 to cause the hub member to rotate relative to the pin 88 while leftward movement results in the lever unwinding of the coils so that no rotational movement is transmitted to the hub member.

In order to prevent undesirable rotation of the hub member 92 when the lever 108 is in a position to unwind the coils, a braking connection is provided between the hub member 94 and the stationary mounting bracket 70 by the second coil spring 102. To this end, the spring is adapted to be located between the enlarged diameter portion 106 on the hub member 94 with its inner end freely disposed about the portion 104 while the opposite end is positioned adjacent the ear 86 and securely attached thereto by means of an axially outwardly extending tang 114 adapted to project into engagement with a notch 116 on the outer portion of the ear. Thus, this arrangement gives a stationary reaction point for the coil spring 102 so that when the actuating collar 50 operates to wind the coil spring 100 on the hub member 92, this coil spring 102 reacts to unwind on the hub member 94 whereas in the reverse direction, when the coil spring 100 is operated to unwind on the hub member 92, the coil spring 102 reacts to wind on the cylindrical outer surface 104 of the hub member 94, due to engagement of the tang 114 with the slot 116 in the ear 86 of the stationary mounting bracket 70. Thus, an increase in the resilient and frictional gripping action of the coils of the spring 102 about the surface 104 will result in a drag brake effect which will prevent undesirable rotation of the hub member 94 and, because of the coupling connection, also undesirable rotation of the hub member 92 when the actuating collar 50 is being returned to its normal starting position.

To translate movement from the adjusting device 70 to the adjusting ring 18 to accommodate for wear occurring in the friction clutch surfaces, a worm gear 118 is integrally formed on the larger diameter portion 106 of the second hub member 94 for selectively engaging an internally toothed portion 120 on the interior peripheral portion of the adjusting ring 18. The worm gear 118 is constructed with a right-hand helix or convolution so as to correspond to the convolutions of the coils of the springs 100–102. With this arrangement, it can be seen that rotation of the hub members 92 and 94 will result in simultaneous rotation of the worm gear 118 and by its engagement with internal teeth 120, will be in a position to effect rotation of the adjusting ring 18 with this rotation resulting in the adjusting ring being shifted inwardly relative to the cover 14 through the threaded engagement 20 and thereby positioning the pivot pin 24 in a direction toward the flywheel 12.

From the foregoing, it can be seen that the coil spring 100 on the first hub member 92 functions to transmit drive to the hub member 92 in one direction only, that being when the actuating collar 50 is being shifted toward a clutch disengaged position (to the right in FIG. 2). In the reverse direction, with the actuating collar being shifted to the left, back to the normally engaged position of the clutch, the spring 100 overrides the hub member 92 with a slight drag.

The second coil spring 102 associated with the second hub member 94 is connected to the stationary mounting bracket 70 and operates in a manner just the reverse of the first spring 100, i.e., when the first spring 100 is in a position to be winding on the hub member 92, the second spring 102 is in the process of unwinding with respect to the hub member 94 and when the first spring 100 unwinds relative to the hub member 92, the second spring 102, by its connection with the stationary mounting bracket 72, tends to be wound tightly on the hub member 94.

As stated earlier, the extent of the lost motion travel built into the hub members 92 and 94 is equal to a normal release stroke which in this case, is equal to the distance $A + B$ in FIG. 2, so that during normal operation of the throw-out bearing 56, the first hub member 92 will be allowed to follow the normal rearward stroke of the throw-out bearing without turning the second hub member 94. However, with wear, a release stroke greater than the distance $A + B$, will result in the first hub member 92 rotating sufficiently about pin 88 to rotate the second hub member 94 as the drive lugs 96—96 engage the sides of the slots 98—98 after having passed through the space provided for lost motion travel.

As seen in FIG. 1, the opening 74 in the back face of the cover 14, as stated earlier, is triangular shaped and the mounting bracket 70 is secured to the cover so as to be angled slightly across the opening downwardly from left to right. The opening 82 in the mounting bracket 70 is circular in shape while the opposite opening 80 is circumferentially elongated so that when the bolts 76 and 78 are sufficiently loosened, the bolt 78 in opening 82 serves as a pivot for permitting the left end of the bracket 70 to be pivoted downwardly so that the worm gear 118 can be disengaged from the internal circumferential teeth 120 on the adjusting ring 18. The opening 112 in the lug 75 of the actuating collar 50 is of sufficient depth to accommodate the downward movement of the coiled end 110 of the lever 108 of spring 100 when the bracket is pivoted downwardly. The disengagement of the worm gear 118 is provided so that when the clutch is installed, an initial manual adjustment of the adjusting ring 18 can be made with a suitable tool. This initial adjustment is made in a well known manner by passing the tool through an opening 122 in the cover 14 so that it engages shallow circumferentially spaced lugs 124 on the back face of the adjusting ring 18.

OPERATION

Assuming the clutch is in its normally engaged position, indicated by the position A of the throw-out bearing 56 in FIG. 2, and no wear has taken place in the friction surfaces, the throw-out bearing passes from position A to position B with no effect on the adjusting device. As this movement takes place, the actuating collar 50 is moving the lever 108 of the spring 100 in the same direction so that rightward movement causes the spring to wind about the outer surface of the hub member 92 resulting in a gripping action which will rotate the hub member 92 slightly as it follows in a counterclockwise direction of rotation relative to pin 88. However, since sufficient wear has not occurred to require an adjustment, the hub member 92 does not rotate sufficiently to transmit rotation to the hub member 94. As the throw-out bearing 56 is shifted back to its clutch engaged position, the left in FIG. 2 to position A, the coils of the first spring 100 are expanded and increase in diameter so that their gripping action is effectively released and the male hub member 92 will remain in this position and not be rotated back to its original position since the spring 100 will slip and the spring 102 is acting as a brake on the hub member 94.

As gradual wear occurs in the clutch friction surfaces due to continuous operation of the clutch, the actuating collar 50 assumes a position further and further to the left of position A with the result being that the release stroke becomes increasingly longer causing the hub member 92 to now assume a position where it will rotate the hub member 94 slightly through spring 100. As the spring 100 drives the hub member 92 to cause it to rotate about the pin 88 in a counterclockwise direction as viewed in FIG. 2. When it was rotated sufficiently to have travelled the extent of the lost motion connection, the lugs 96—96 become operative through engagement with the sides of the mating slots 98—98, it will cause corresponding counterclockwise driving rotation of the hub member 94 resulting in simultaneous counterclockwise turning rotation of the integral worm gear 118 and accordingly counterclockwise rotation of the adjusting ring 18. The worm gear 118 by its movement into engagement with each succeeding tooth of the adjusting ring 18 effects the desired adjustment. Under these conditions, a gradual turning of the worm gear 118 results each time the clutch is shifted to its disengaged position (position B in FIG. 2). This rotation of the adjusting ring 18 occurs in a counterclockwise direction and effects leftward axial movement of the adjusting ring due to the threaded connection 20. Accordingly, this leftward movement serves to carry pivot pin 24 nearer the flywheel so that the pivot point for the levers 22 will be maintained in a satisfactory position to enable proper operation of the clutch without excessive pedal travel.

As indicated earlier, when the clutch throw-out bearing 56 is operated to disengage the clutch 10, that is, when the actuating collar 50 is pulled to the right (FIG. 2), the lost motion is initially taken up before the worm gear 118 is actuated or in a position to effect adjustment of the adjusting ring 18. The lost motion is sufficient to permit the pressure plate 18 to release the driven element 30 of the clutch or permit the retraction springs 62 to re-act sufficiently so that the adjusting ring 18 is turned while the clutch is disengaged.

Accordingly, a simple unit has been provided which senses wear travel of the actuating collar and is operative automatically to effect adjustment of an adjusting ring to compensate for wear of the friction faces of a clutch.

It will be evident that the coupling connection between this hub members can be accomplished in other ways, for example, the drive lugs can be constructed as an arcuate shape and the mating slots as arcuate pockets, also, if desired the support pin may be altered slightly to provide a shoulder portion which will serve to reduce frictional contact between the inner engaging faces of the hub members while still maintaining the driving connection.

Since numerous other changes in the embodiment disclosed can be made within the spirit and scope of the inventive concept taught herein, it is intended that the invention not be limited to the specific embodiment shown and described but that the invention be given a scope consistent with the language of the following claims.

I claim:
1. A clutch comprising:
   A. a drive member,
   B. support means secured to said drive member,
   C. a clutchable driven member,
   D. means for clutching the driven member to the drive member including,
      a. lever means having a pivotal connection,
   E. movable actuating means operable connected to said lever means to pivot said lever means about said pivotal connection to clutch said drive and driven members,
   F. adjusting means supporting said pivotal connection and connected to said support means for relative rotative movement,
   G. an adjuster device mounted on said support means including,
      a. first and second rotatable hub members and a lost motion coupling connection therebetween,
      b. a coil spring for rotating said first hub member upon being actuated, said coil spring connected to and actuated by said actuating means,
      c. a worm gear integral with second hub member and connected to said adjusting means for rotating said adjusting means relative to said support means,
   H. said coil spring being actuated upon movement of said actuating means to rotate said first hub member and through said lost motion coupling connection actuating said second hub member for causing said worm gear on said second hub member to rotate said adjusting means relative to said support means for moving said pivot connection.

2. A clutch comprising:
   A. a drive member,
   B. support means secured to said drive member,
   C. a clutchable driven member,
   D. means for clutching the driven member to the drive member including,
      a. lever means having a pivotal connection,
   E. movable actuating means operably connected to said lever means to pivot said lever means about said pivotal connection to clutch said drive and driven members,
   F. adjusting means supporting said pivotal connection and connected to said support means for relative rotative movement,
   G. an adjuster device mounted on said support means including,
      a. first and second rotatable hub members and a lost motion coupling connection therebetween,
      b. a first coil spring for rotating said first hub member upon being actuated, said coil spring connected to and actuated by said actuating means upon movement thereof in one direction,
      c. a second coil spring for braking said second hub member, said coil spring having one end secured to said support means and its opposite end free for providing a braking connection for said second hub member prohibiting movement thereof upon movement of said actuating means in the opposite direction,
      d. a worm gear integral with said second hub member and connected to said adjusting means for rotating said adjusting means relative to said support means,
   H. said coil spring being actuated upon movement of said actuating means to rotate said first hub member and through said lost motion coupling connection actuating said second hub member for causing said worm gear on said second hub member to rotate said adjusting means relative to said support means for moving said pivot connection.

3. A clutch according to claim 2, wherein said first and second coil springs have a plurality of helical convolutions of the same hand and surround and grip said hub members upon winding of said coil springs.

4. A clutch according to claim 3 wherein said helical coil springs have an internal diameter slightly less than an external diameter of said hub members engaged thereby.

5. A clutch comprising:
   A. a drive member,
   B. support means secured to said drive member,
   C. a clutchable driven member,
   D. means for clutching the driven member to the drive member including,
      a. lever means having a pivotal connection,
   E. movable actuating means operably connected to said lever means to pivot said lever means about said pivotal connection to clutch said drive and driven members,
   F. adjusting means supporting said pivotal connection and connected to said support means for relative rotative movement,
   G. an adjuster device mounted on said support means including,
      a. first and second rotatable hub members,
      b. a lost motion coupling connection between said first and second rotatable hub members including drive lugs and slots on said hub members for mutual engagement and dimensioned to permit limited free movement of said hub members before engaging and affecting movement of said pivotal connection,
      c. a coil spring for rotating said first hub member upon being actuated, said coil spring connected to and actuated by said actuating means;
      d. a worm gear integral with said second hub member and connected to said adjusting means for rotating said adjusting means relative to said support means, H. said coil spring being actuated upon movement of said actuating means to rotate said first hub member and through said lost motion coupling connection actuating said second hub member for causing said worm gear on said second hub member to rotate said adjusting means relative to said support means for moving said pivot connection.

* * * * *